Dec. 29, 1953     H. E. HORTMAN, JR     2,663,957
IRONING TABLE TOP AND METHOD OF MAKING THE SAME
Filed April 12, 1950     3 Sheets-Sheet 1
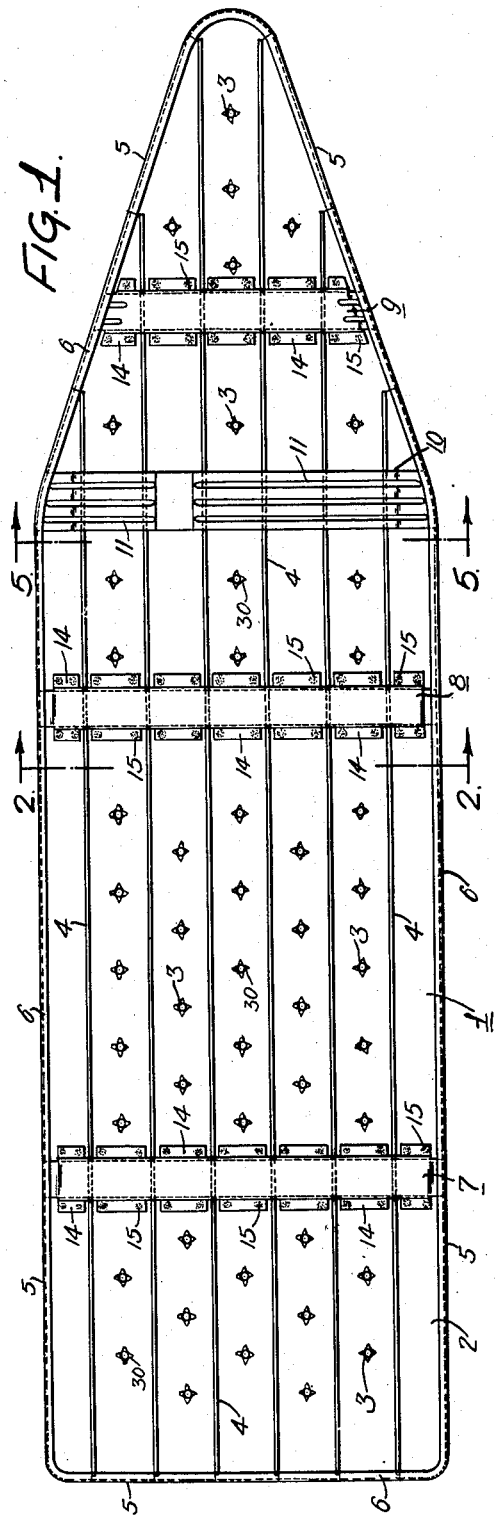
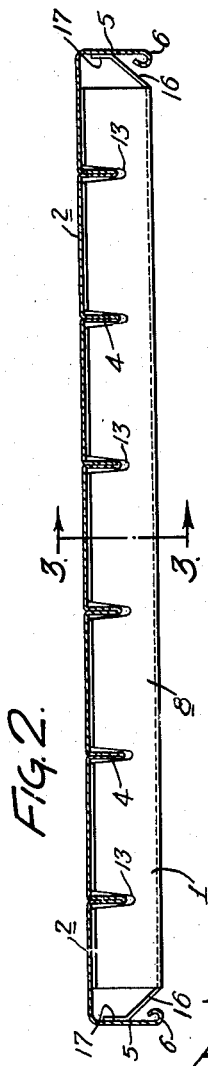
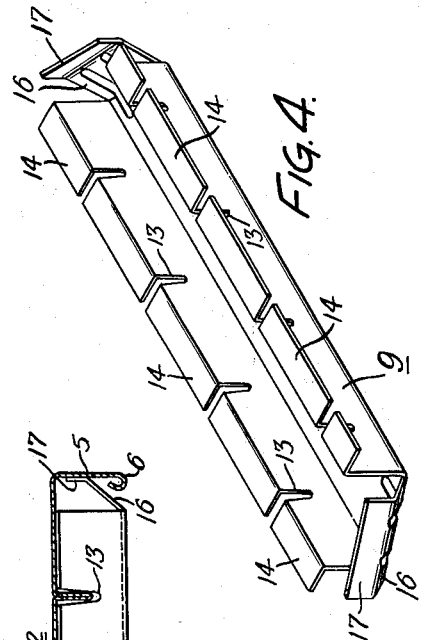
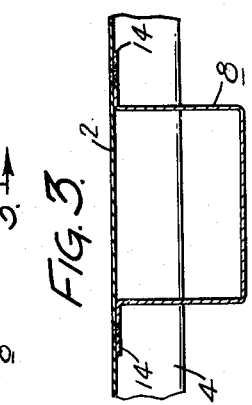
Inventor:—
Harvey E. Hortman Jr.
by his Attorneys
Howson & Howson Dec. 29, 1953 H. E. HORTMAN, JR 2,663,957
IRONING TABLE TOP AND METHOD OF MAKING THE SAME
Filed April 12, 1950 3 Sheets-Sheet 2
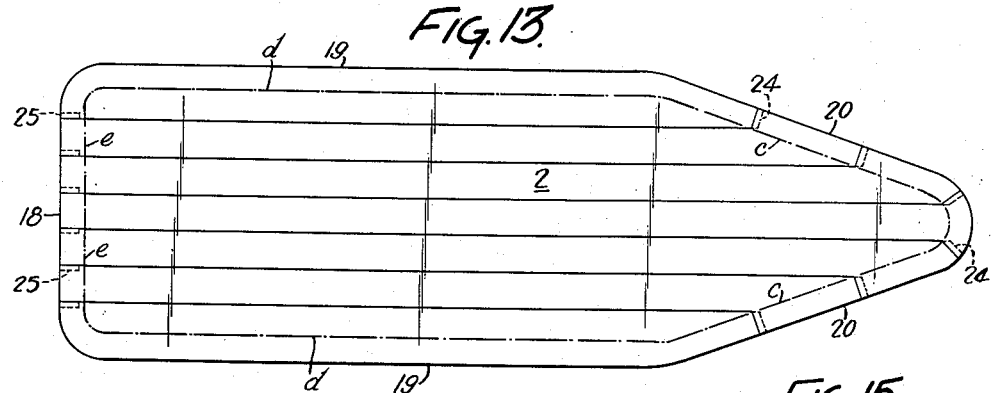
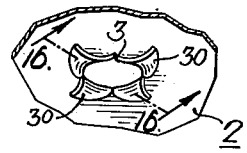
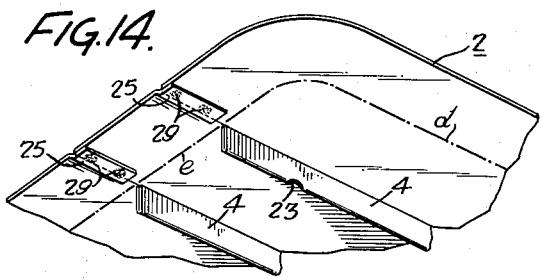
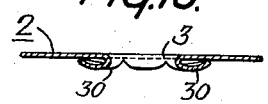
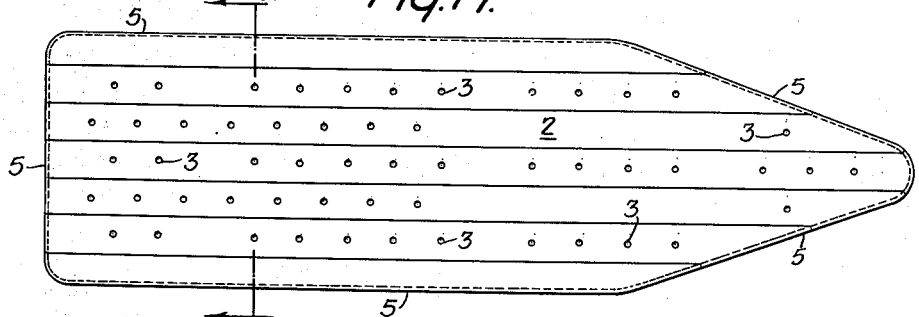
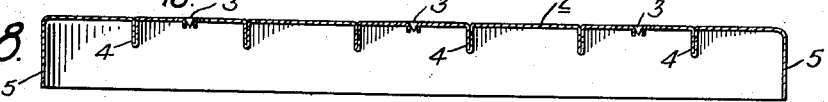
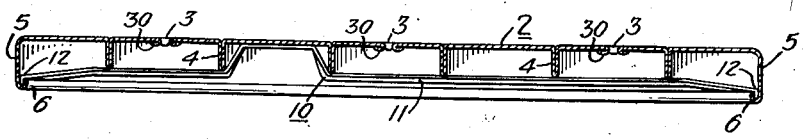
Inventor:—
Harvey E. Hortman Jr.
by his Attorneys
Howson & Howson Dec. 29, 1953  H. E. HORTMAN, JR  2,663,957
IRONING TABLE TOP AND METHOD OF MAKING THE SAME
Filed April 12, 1950  3 Sheets-Sheet 3
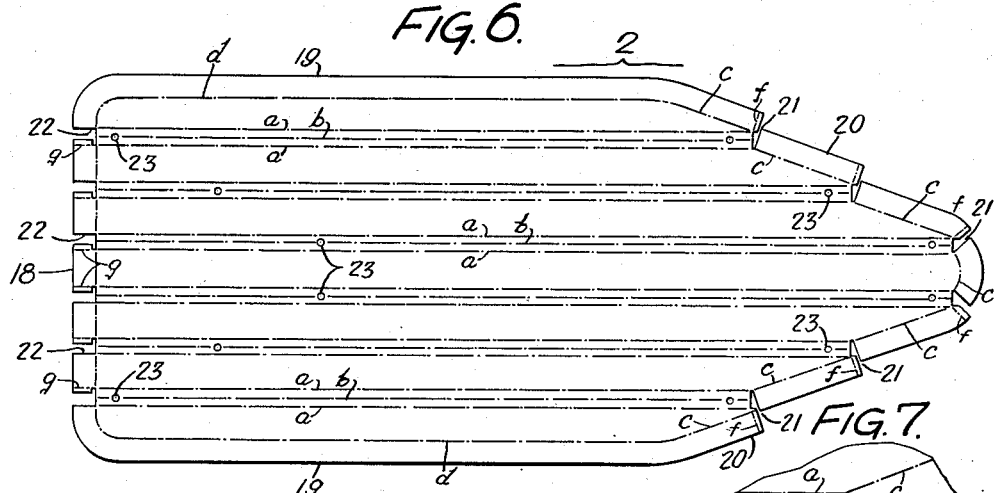
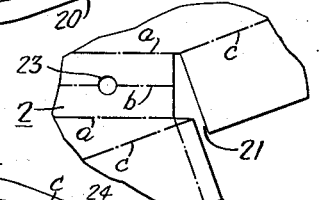
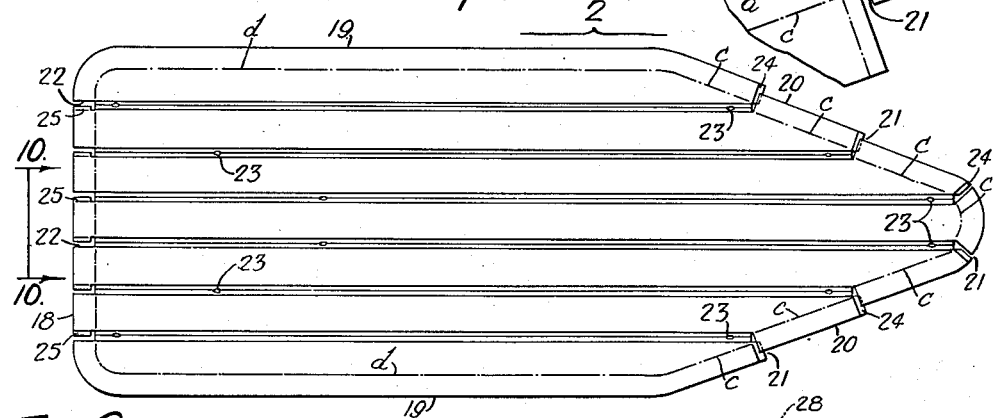
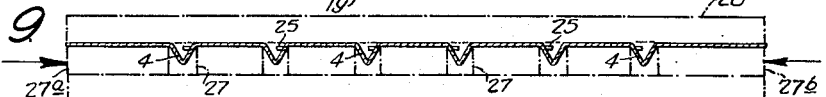
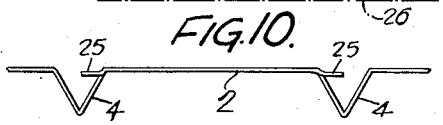
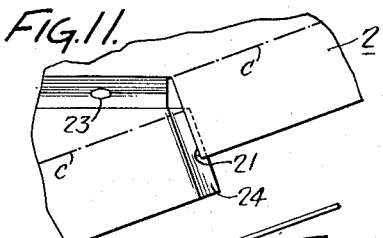
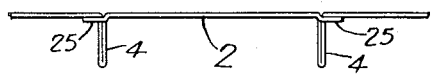
Inventor:—
Harvey E. Hortman Jr.
by his Attorneys
Howson & Howson Patented Dec. 29, 1953

2,663,957

UNITED STATES PATENT OFFICE 2,663,957

IRONING TABLE TOP AND METHOD OF MAKING THE SAME

Harvey E. Hortman, Jr., Southampton, Pa., assignor to Proctor Electric Company, Philadelphia, Pa., a corporation of Pennsylvania Application April 12, 1950, Serial No. 155,436

6 Claims. (Cl. 38—137)

The present invention relates to ironing tables and more specifically to a novel ironing table top construction and a method of fabrication thereof especially adapted to an all-metal construction. The ironing table top forms part of the ironing table construction disclosed and claimed in my copending application Serial Number 155,435 filed April 12, 1950.

An important object of this invention is to provide an ironing table top which may be fabricated from a single sheet of metal, preferably a sheet of light gauge metal.

Another object of the invention is to provide a novel ironing table top construction and a novel method of making the same.

A further object of the invention is to provide a light-weight, strong an durable table top which is capable of economic manufacture.

Other features and objects of this invention will be apparent from the detailed description that follows.

In the drawings:

Fig. 1 is a bottom view of the ironing table top showing the transverse bracing members in place;

Fig. 2 is a sectional view taken along line 2—2 of Fig. 1;

Fig. 3 is a detail sectional view taken through the brace shown in Fig. 2 along line 3—3;

Fig. 4 is an isometric view of the brace in the nose portion of the table top;

Fig. 5 is a sectional view taken through the table top along line 5—5 of Fig. 1 and showing another of the braces;

Fig. 6 is a face view of the flat blank from which the table top is formed;

Fig. 7 is an enlarged view of a portion of the blank;

Fig. 8 is a plan view of the table top blank after the V-forming operation;

Fig. 9 shows a cross-section through the table top as shown in Fig. 8, with a diagrammatic showing in phantom of the hydraulic fixture used for closing the V's;

Fig. 10 is an enlarged view of an end portion of the table top after the V-forming operation, said view being taken on the line 10—10 of Fig. 8;

Fig. 11 is an enlarged plan view of a section of the table top as shown in Fig. 8;

Fig. 11a is an elevational view of the same section;

Fig. 12 is a view similar to Fig. 10 but taken after closing of the V's;

Fig. 13 is a top view of the table top after the closing of the V's;

Fig. 14 is an isometric view of a portion of the rear edge of the table top after welding;

Fig. 15 is an isometric view of a portion of the table top showing one of the ventilating holes;

Fig. 16 is a corresponding cross-sectional view;

Fig. 17 is a plan view of the table top after the forming of the skirt; and

Fig. 18 is a sectional view taken along line 18—18 of Fig. 17.

The table top structure 1, as shown in Figs. 1 and 2, comprises a top member 2 having ventilating holes 3, longitudinally disposed ribs or stiffeners 4, a skirt 5 provided around the entire periphery of the top member 2 having a curl 6 formed at the lower edge thereof, and channel-like braces 7, 8, and 9 secured to the underside of the top member and to the skirt for reinforcing the top in the transverse direction. An additional stiffener 10 ribbed at 11 is provided with flanges 12 (Fig. 5) for nestling inside the curl 6 on the skirt 5 at the beginning of the tapered portion of the table top. This stiffener increases the longitudinal stability of the table top, being placed in tension when a load is applied to the front of the table top. The braces 7, 8 and 9, as shown in Figs. 2, 3 and 4, are provided with grooves 13 to receive the longitudinal ribs 4 and have side flanges 14 for securing to the top at 15 as by spotwelding. Extensions 16 having upwardly extending flanges 17 are disposed at the ends of said braces for securing to the skirt 5 by spotwelding, thereby adding further rigidity to the skirt.

The entire top member 2, including the longitudinal ribs 4 and skirt 5, is formed from a single sheet of metal in a manner to be described presently. This construction makes it possible to use a .015" steel sheet to provide a top that is light in weight and has sufficient strength requirements. The manufacturing procedure includes the following steps.

I. *The formation of a flat blank which represents the combined top 2, ribs 4 and skirt 5 in developed form*

The blank is shown in Fig. 6 as having a straight rear edge 18, straight sides 19 for a greater portion of the length of the blank, and a tapered leading edge 20 which will comprise the front edge of the ironing table top 1. Cutouts 21 and 22 are provided respectively along the tapered and rear edges of the blank, while locating holes 23 are provided to insure accurate positioning during subsequent forming operations.

The dot and dash lines represent the locations of the edges or bends which are to be formed in subsequent operations. Thus lines *a* represent the top edge of the stiffening ribs 4 while lines *b* represent the bottom fold thereof. Lines *c*, shown in segments, constitute the leading edge of the table, lines *d* constitute the side edges, and lines *e* constitute the rear edge. It will be seen from Figs. 8 and 13 that as the pairs of lines *a* are brought together, lines *c* will be made continuous and colinear. Lines *f* adjacent the cutouts 21, and lines *g* adjacent the cutouts 22 represent lines where offsets 24 and 25 are to be made (see Figs. 9, 10, 11 and 14) to permit overlapping during subsequent forming operations.

II. *The V-forming operation to start the formation of the longitudinal stiffening ribs and the formation of the offsets 24 and 25*

The V's are formed by progressively passing the blank sheet through a suitable press brake using the locating holes 23 for alignment therein. It will be noted that the alignment holes are arranged in pairs along lines *b* and are spaced a like amount from the leading edge of each rib. This prevents interference of the portions of the skirt that comprise the leading edge with one another during the forming operations. Simultaneous with the formation of each V, an offset 24 is formed at the front edge of each rib and an offset 25 is formed at the rear edge thereof.

It is of course obvious to those skilled in the particular art that it is entirely possible to form the offsets in the leading edge during the blanking operation or in the rib-closing operation that follows.

III. *Rib closing operation*

This operation is carried out in a hydraulic fixture which is shown in Fig. 9 to comprise a lower platen 26, slidable blocks 27 and a top platen 28. The blank with the V's formed therein is placed so that the partially formed stiffener members are located between the slidable blocks. Pressure is applied to one of the slidable blocks 27a through hydraulic means while another of the blocks 27b is held stationary. Movement of block 27a under the hydraulic force causes the V's to be closed giving the closed rib form as shown in Fig. 12. Throughout this operation, the top platen 28 is held against the top surface of the blank with sufficient pressure to hold the ribs being formed in the blank down between the blocks 27.

Suitable apertures and ejecting pins (not shown) are provided in the hydraulic fixture so that after the upper platen 28 is raised the formed blank may be removed.

After the rib closing operation, the blank appears substantially as shown in Fig. 13.

IV. *Spot welding operation to secure overlapping edges at the periphery of the sheet*

The overlaps in the front and rear edges of the stiffeners are spot-welded as at 29 (see Fig. 14) in this operation. The offsets 24 and 25 in these overlaps (partially formed in operation II) are folded further during the welding operation to present a substantially continuous coplanar outside surface for the skirt 5. This spot welding operation preferably precedes the skirt turning operation described below. However, the two operations could be reversed in sequence.

V. *Turn and pierce operation to form the skirt and the ventilating holes in the top surface*

After the welding operation the blank with the stiffeners formed therein is taken to a suitable press where the skirt 5 is formed along lines *c*, *d*, and *e*. Simultaneous with this operation, the ventilating holes 3 are pierced in the top surface 2 of the table top. See Fig. 18.

VI. *Curling operation to form curl on skirt and for forming curled edge around periphery of ventilating holes*

The top with the formed skirt (Figs. 17 and 18) then has the curl 6 formed in the skirt 5. Also simultaneous with this operation, a curl 30 is formed around the periphery of the ventilating holes 3. The curl in the ventilating holes was found to be of importance in the adaptation of very thin steel sheet stock to an ironing board top. It was found that without the curl, slight distortions in the vicinity of the ventilating hole would result in a sharp abutting surface to the table top. The use of the curl increased the strength in the vicinity of the hole and removed the sharp edge.

Following the construction of the ironing table top, brace 10 is inserted into position by inserting the flanges 12 into the curl 6 at the bottom edge of the skirt. The brace is then forced forward toward the nose of the table locking it into position and obviating the necessity of welding to the skirt.

The channel-shaped braces 7, 8 and 9 are then inserted and welded in position as in Fig. 1. The slots 13 in the channel keep the ribs 4 from bending and improve the structural stability of said ribs when they act as reinforcing members. The assembly of the slotted channel braces to the ribbed underside of the table top is facilitated by the V-shape of these slots. Thus any of the ribs which might be slightly misaligned are cammed into position by the sidewalls of the slots adjacent thereto.

When applied to a complete ironing board structure as in the aforementioned application, the brace members 7, 8 and 9 form mounting members for the legs and the height adjustment mechanism. Reference may be had to that application for the details of this construction.

It will be understood, of course, that the present invention is not restricted to the specific structure and method as disclosed but is intended to cover modifications which may be made by those skilled in the art and are within the scope of its teaching.

I claim:

1. An ironing table top tapered at its forward portion and having a rear edge, said top comprising a sheet metal member having a planar top surface and having a plurality of spaced longitudinal closed V-ribs reinforcing said member and defining longitudinal sections thereof contiguous to one another, and a down-turned skirt on said member about the entire edge periphery thereof perpendicular to said planar top surface, said skirt along the rear edge of said member comprising sections which are rear extensions of said longitudinal sections, each of said skirt sections being secured to the adjacent skirt section at the rear end of one of the ribs by a tab extending along one of the vertical edges of one section and depressed inwardly to lie behind the adjacent section, thereby to provide continuity of the skirt along the rear edge of said member, said skirt along the tapered forward edges of said member comprising sections which are front extensions of said longitudinal sections, each of said last-mentioned skirt sections being secured to the adjacent skirt section at the front end of one of the ribs by a tab extending along one of the vertical edges of one section and depressed inwardly to lie behind the adjacent section, thereby to provide continuity of the skirt along the tapered forward edges of said member.

2. An ironing table top according to claim 1, wherein the rear edge of said top is straight and at right angles to said ribs, and the rear skirt sections are aligned along the straight rear edge.

3. An ironing table according to claim 1, wherein the skirt sections are welded together, and the edge portion of the skirt is turned inwardly and upwardly to provide a smooth edge.

4. An ironing table top according to claim 1, further comprising a plurality of longitudinally-spaced transverse braces on the under side of the top member, said braces being notched to accommodate said ribs and being secured to the under side of said top member and to said skirt.

5. An ironing table top according to claim 4, further including an inwardly curled edge on said skirt, and a transverse brace on the under side of the top member at the beginning of the tapered portion thereof, the ends of said brace being trapped and held by the curled edge of the skirt.

6. An ironing table top according to claim 1, wherein said top member is provided with ventilating apertures in at least some of the longitudinal sections defined by the ribs.

HARVEY E. HORTMAN, Jr.

References Cited in the file of this patent
UNITED STATES PATENTS

| Number | Name | Date |
|---|---|---|
| 1,096,218 | Berry | May 12, 1914 |
| 2,233,735 | Fay | Mar. 4, 1941 |
| 2,396,733 | Greulich | Feb. 20, 1945 |
| 2,495,468 | Mueller | Jan. 24, 1950 |
| 2,542,818 | Krantz | Feb. 20, 1951 |